United States Patent

[11] 3,624,402

| [72] | Inventor | William J. Thaler<br>Centreville, Va. |
|------|----------|---------------------------------------|
| [21] | Appl. No. | 703,959 |
| [22] | Filed | Feb. 8, 1968 |
| [45] | Patented | Nov. 30, 1971 |
| [73] | Assignee | President and Directors of Georgetown University<br>Washington, D.C. |

[54] ELECTROMAGNETIC BEAM COMMUNICATION UNIT
14 Claims, 4 Drawing Figs.

| [52] | U.S. Cl. | 250/199 |
|------|----------|---------|
| [51] | Int. Cl. | H04b 9/100 |
| [50] | Field of Search | 343/17.1; 350/161 UX; 250/199; 350/160 |

[56] References Cited
UNITED STATES PATENTS

| 3,088,113 | 4/1963 | Rosenthal | 343/17.1 |
| 3,111,666 | 11/1963 | Wilmotte | 350/161 UX |
| 3,262,058 | 7/1966 | Ballman | 250/199 |
| 3,297,876 | 1/1967 | De Maria | 250/199 |
| 3,437,951 | 4/1969 | Dailey | 350/160 |

Primary Examiner—Robert L. Griffin
Assistant Examiner—Anthony H. Handal
Attorney—Shlesinger, Arkwright & Garvey ABSTRACT: A modulation cell which has two crystals side-by-side and oppositely oriented are driven by the same electromagnetic frequency modulated signal transmitter to form in the cell two parallel but similar moving periodic electro-optic diffraction gratings. An electromagnetic signal carrier producing source, such as a laser, has its beam pass through the sides of the cell and both electro-optic diffraction gratings. The zero diffraction order of the beam after it leaves the crystal has a frequency component which corresponds to the frequency modulated signal. The modulation cell may be a liquid or gas unit, with two sets of transmitters and absorbers, or the modulation cell may contain two oppositely oriented side-by-side optical crystals having an integral electromagnetic wave guide along which the frequency modulated signal is passed to the crystal.

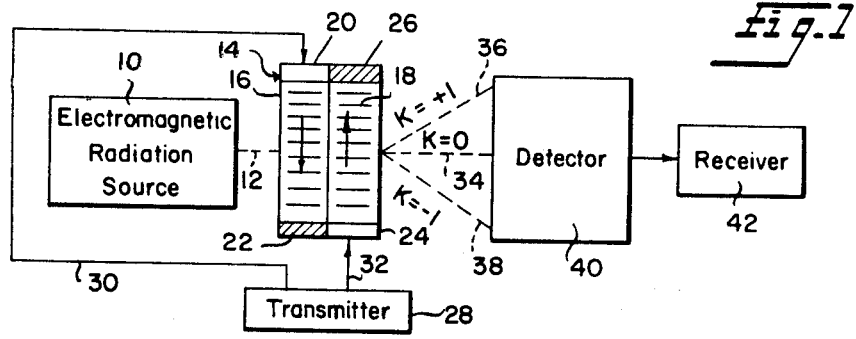
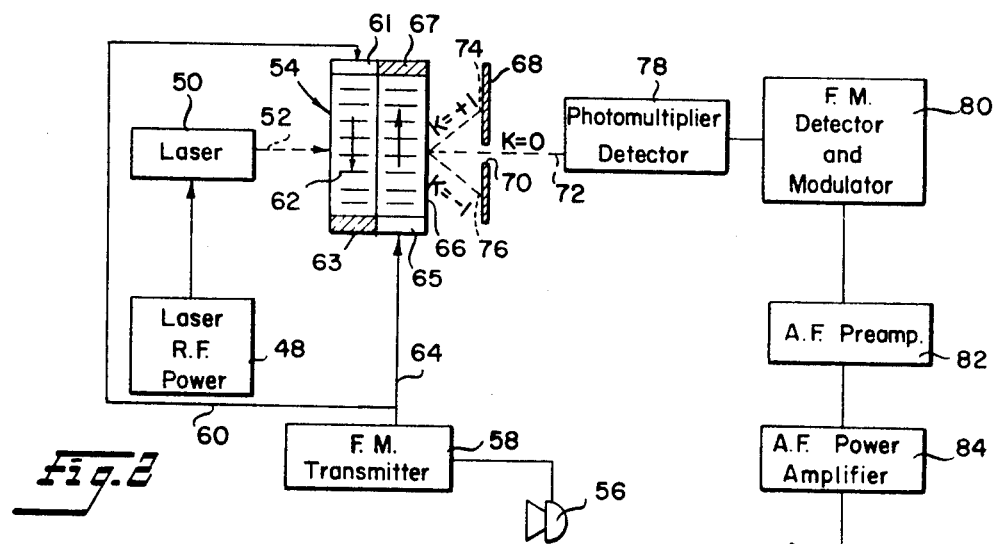
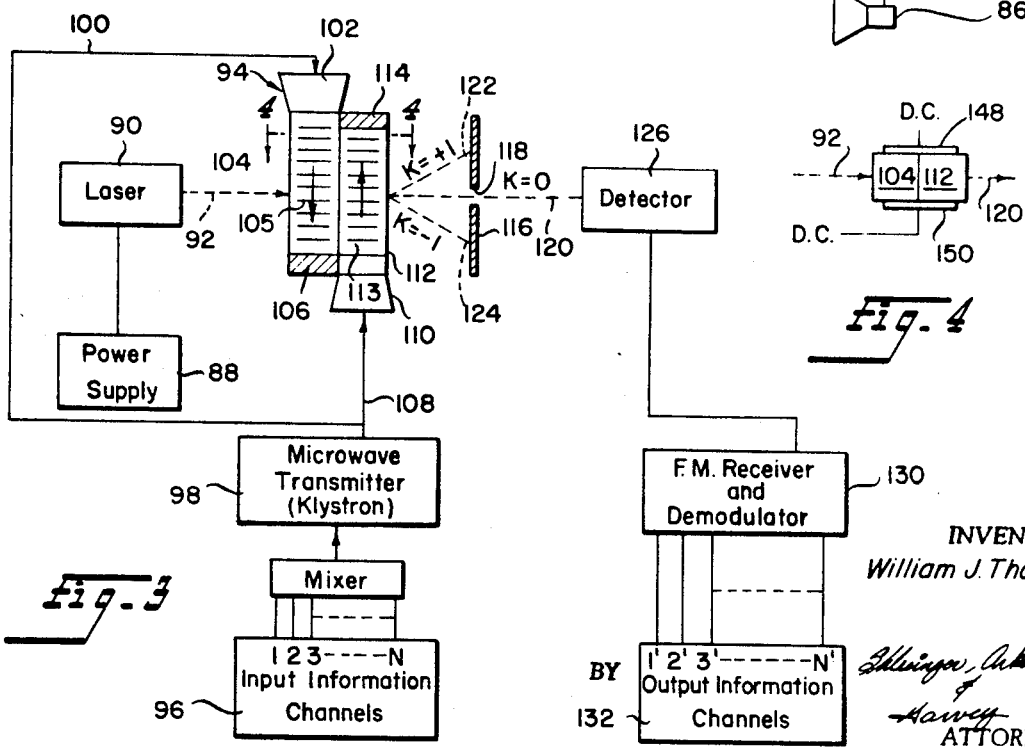
INVENTOR
William J. Thaler
BY
ATTORNEYS

ELECTROMAGNETIC BEAM COMMUNICATION UNIT

BACKGROUND OF THE INVENTION

This invention relates to a frequency modulation communication system employing a directional electromagnetic carrier wave, such as a microwave or laser beam. The system will be described with particular reference to a laser beam, but it should be understood that this invention applies to other types of directional magnetic radiation.

The ability of laser beams to carry a large number of frequencies over great distances gives promise of widespread use of laser systems in the future communication networks.

There has been a major and successful effort toward the building of amplitude-modulated laser systems, and recent development of a frequency-modulated system. This invention is specifically directed toward improvement of a frequency-modulated laser communication system.

Previously suggested frequency-modulated laser systems employ ultrasonic waves in a modulation cell to produce a traveling diffraction pattern which will interact with a laser beam passing through the modulation cell to produce different diffraction orders containing frequencies dependent upon the frequency of the ultrasonic wave passing through the cell. Beating of adjacent diffraction orders will permit detection of the frequency-modulated signal applied to the cell through the ultrasonic waves. This system restricted use of such modulation cells to an ultrasonic frequency wave and required use of special optical instruments to collect, collimate, and mix the selected diffraction orders to detect the frequency modulation. This invention makes it possible to detect the frequency modulated signal directly, and does not require the mixing of selected diffraction orders nor any collimating equipment.

SUMMARY OF THE INVENTION

Accordingly, it is a principal object of this invention to provide a frequency modulation system for directional electromagnetic communication carriers, such as microwaves and laser beams.

It is a further object of this invention to provide a means for frequency modulating such carriers by electromagnetic frequency modulated waves.

It is a still further object of this invention to produce a frequency modulated carrier wave which does not require beating of adjacent diffraction orders to detect the frequency modulation signal applied to the modulation cell.

It is another object of this invention to simplify the detection of frequency modulation signals in the electromagnetic carrier wave.

It is a still further object of this invention to provide a new type of modulation cell wherein the zero diffraction order of the carrier wave, after passing through such cell, has a component which is proportional to the frequency of the frequency-modulated wave applied to the modulation cell.

Other objects and advantages of the invention will become apparent to those skilled in the art from the following description and drawings.

DESCRIPTION OF THE DRAWINGS

FIG. 1, is a schematic block diagram of the communication systems showing the new two crystal modulation cell.

FIG. 2, is a schematic block diagram of a laser beam frequency modulation communication system.

FIG. 3, is a schematic block diagram of a laser communication system for a plurality of channels, and showing a modulation cell using solid crystals and a wave guide.

FIG. 4, is a sectional along 4—4 of FIG. 3 showing bias plates.

DESCRIPTION OF THE INVENTION

The invention is directed to the method of frequency modulating a beam of radiant energy which can be used in a communication system, using a transmitting short wavelength carrier; basically the principle of traveling wave diffraction in a modulation cell to impress a frequency-modulated signal on the carrier wave is employed.

One of the previously suggested techniques for frequency modulating such a carrier used a frequency modulation cell activated by an ultrasonic wave to produce a moving periodic diffraction grating within the cell, and through which the carrier wave is passed. The present invention contemplates the use of a new modulation cell technique wherein two traveling wave diffraction gratings, traveling in opposite directions, are used. The electromagnetic beam radiation passing through both of these gratings experiences a double-scattering effect on frequency displacement, so that the zero diffraction order itself contains a component reflecting a frequency modulation signal applied to the modulation cell.

Referring particularly to FIG. 1, an electromagnetic radiation source 10 emits a direction oriented electromagnetic wave 12 which passes through the modulation cell unit 14.

This modulation cell unit consists of two oppositely disposed crystal modulation cells 16 and 18. These crystal assemblies may be either solid, liquid or gas, and capable of conducting ultrasonic waves and transparent to the electromagnetic radiation beam 12.

The crystal 16 has a quartz transducer 20 which propagates ultrasonic waves across the cell where they meet the absorber 22.

The modulation cell consists of a glass tank filled with distilled water through which the ultrasonic wave is propagated as a traveling periodic wave moving from transducer 20 to absorber 22. Absorber 22 is preferably a sponge which has a convex surface facing the oncoming ultrasonic waves. The arrows show the direction of propagation of the ultrasonic waves which produces a traveling diffraction grating 23.

The crystal cell 18 is disposed immediately adjacent the crystal cell 16 and oriented so that its traveling wave diffraction grating 19 travels in the opposite direction to that of crystal 16. A transducer 24 radiates ultrasonic waves which travel along the length of the cell to the absorber 26. The construction of this crystal is similar to that of crystal 16. The absorbers 22 and 26 may be any type of known sound or wave traps presently used which are effective in preventing reflection of waves from the material of which the modulation unit is constructed.

A frequency-modulating transmitter or generator 28 is directly connected to the transducers 20 and 24 by the lines 30 and 32 respectively.

The coherent beam of electromagnetic waves 12 is passed through each of the cells orthogonally to the line of travel of the gratings in the modulation cells 16 and 18. The electromagnetic beam 12 on passing through the first diffraction grating 24 produced by the ultrasonic waves is diffracted by the periodic density variation thereof. A diffraction spectrum consisting of the varying diffraction orders is produced. If only one cell were used the diffraction orders would be spaced in a plane orthogonal to the direction of the incident electromagnetic beam 12 by a distance which depends upon the wave length of the ultrasonic waves and the distance from the ultrasonic modulation cell to the plane of detection of the spectrum. In this instance the frequency of the light contained in the diffraction spectrum is different than the frequency of the incident beam 12.

In the circumstances where only one cell is used, it has been found that the zero order can be combined or mixed with any other single order of the diffraction spectrum, producing a beat note which can be a frequency modulated by modulating the frequency of the ultrasonic transducer 20. The present state of the art permits the generation and propagation of at least ten kilomegacycle ultrasonic waves.

However, when two modulation cells are placed side-by-side with the diffraction gratings traveling in opposite directions, both cells produce a volume scattering interaction of all of the electromagnetic beam diffraction orders so that the frequency shifted radiation is scattered back into the zero order after passing through the first modulation cell. The zero diffraction order propagates in the same direction as the incident electromagnetic beam, but contains the frequency shifted components in addition to the unshifted original electromagnetic frequency of the beam 12.

Theory and experience show that the frequency in the diffracted light scattered into the zero order is twice that of the frequency imparted to the transducers 20 and 24 by the transmitter 28. If the transducer signal is frequency modulated the modulation will appear with the same modulation rate at double the imparted frequency.

The zero diffraction order 34, which emerges from the modulation cell unit must be detected, since it contains the desired frequency modulated signal. The adjacent diffraction orders 36 and 38 are not necessary to obtain the desired frequency modulated signal, and therefore it is unnecessary to collimate the emerging signals. The zero diffraction order frequency is picked up directly in the detector 40, and subsequently passed along to the receiver 42.

This system, using two parallel traveling optical diffraction patterns in the modulation cell unit, eliminates the need for equipment to collect, collimate and mix selected diffraction orders as in previous units of this type, since there is no need to select and combine diffraction orders to detect the frequency modulation signal. With the present unit, only the zero diffraction order must be detected to pick up the frequency modulated signal applied to the modulation cell.

FIG. 2 shows the new two crystal modulation cell assembly using a laser beam and driven by a transistorized FM modulator. A laser power supply 48 activates the laser unit 50 which emits a beam 52 of coherent electromagnetic radiation which passes through the modulation cell assembly generally indicated at 54.

A microphone 56 is connected to a frequency modulation transmitter 58 and simultaneous identical signals are passed therefrom through lines 60 and 64 to the modulation cell 54.

The signal applied along line 60 is applied to transducer 61 which sets up a traveling periodic diffraction grating 62 which is absorbed at the other end of the cell by absorber 63. Similarly, line 64 carries the frequency modulation signal to transducer 65 which sets up within the modulation cell a traveling periodic diffraction grating 66 which is absorbed at the other end of the crystal by absorber 67. The construction of this cell is the same as that of frequency modulation cell 14 in FIG. 1.

In this modification of the invention, an optical diffraction order selector 68 is positioned immediately behind the modulation cell 14 and has an aperture 70 in direct line with the laser beam 52 which will pick up the zero diffraction order 72 as it leaves the modulation cell 54. The first order diffraction frequencies 74 and 76 respectively are shown as being blocked by the selector 68.

After passing through the diffraction order selector 68, the first order diffraction signal 72 is detected by a photomultiplier tube 78. The output from the photomultiplier 78 is passed to a frequency modulation detector and integrator unit 80. The resulting signal is passed to a preamplifier stage 82, and then to a power-amplifier stage 84, the signal of which drives speaker 86.

FIG. 3 shows a multiple channel FM modulator and transmitter communication system using a new type of modulation cell. A laser power supply 88 activates the laser 90 which in turn emits a laser beam 92 of coherent electromagnetic radiation which passes through the modulation cell assembly 94.

The band width of the frequency modulated signal can be widened to permit multiplication of the number of channels used, permitting the use of a plurality of input information channels 1, 2, 3, shown by the input information and mixer blocks 96. They drive the frequency modulator and transmitter 98 through mixer circuits of usual design. The FM transmitter 98 generates a high frequency microwave signal which is carried through conduits 100 and 108 to the modulation cell assembly 94.

The new electric-optical cell includes a broad band wave guide 102 which sets up periodic electromagnetic waves which travel toward the electro-optic crystal 104. At the interface of the crystal the electromagnetic waves are launched into and along the length of the crystal to create periodic changes of the index of diffraction along its length due to the electro-optic effect, creating a traveling diffraction grating 105. At the other end of the crystal, absorber 106 which functions similar to the absorbers of FIGS. 1 and 2 is positioned. Similarly, the electromagnetic waves generated by the transmitter 98 travel along the conduit 108 and generate electromagnetic waves in the wave broadband wave guide 110. These electromagnetic waves are launched into the crystal 112 to set up a diffraction grating 113 which travels across its length and is picked up by the absorber 114.

As in FIG. 2, a diffraction order selector 116 is disposed immediately behind the modulation cell 104 with its aperture 118 in direct alignment with the zero diffraction order 120. The diffraction orders 122 and 124 are blocked. The zero diffraction order is then detected by the detector 126 which passes on its signal to the frequency modulation receiver and demodulator 130 which then passes on the final signal to the output information channel unit 132.

The modulation cells of FIG. 1 and 2 are ultrasonic units, while that of FIG. 3 is activated by an electromagnetic wave launched directly into an electro-optic crystal. The electromagnetic wave will produce periodic index of refraction changes due to the electro-optic effect, producing the traveling periodic diffraction grating similar to that of FIGS. 1 and 2.

The electromagnetic wave is generated by any standard microwave source, such as a klystron tube, which is then propagated down the broadband wave guide units 102 and 110. These are preferably ridged wave guides which are commercially available.

The crystal can be liquid, gas, or a colloidal solution. Preferably, however, a solid crystal of potassium deuterium phosphate, or ammonium deuterium phosphate, or lithium miobate may be used. The solid crystal is approximately one inch long and one-quarter inch square in cross section. FIG. 4 is a section along line 4—4 of FIG. 3 showing DC bias plates 148 and 150 which sensitize the crystal to obtain the maximum electro-optic effect.

This communication system has a great deal of potential with regard to long distance laser communication systems which might function in the same manner as the currently used microwave systems. The laser system is considerably less expensive to install and maintain than the microwave system, and would have a manyfold increase in carrying capacity. The power requirements for a laser system are also considerably less than that for a microwave system, and this would appear to be one of the immediate applications for the current invention.

This communication system could also be used in a closed system using vacuum pipes and be transmitted at any distance with appropriate amplifier or relay stages. A vacuum pipe system makes it possible to use a closed circuit system in which the transmitted beam after leaving the modulation cell could be carried around bends in the pipe, making it useful for internal communication systems requiring large message carrying capacity.

This system is versatile and has many practical applications. The elimination of a need for collimation equipment in this system further simplifies the unit and gives additional advantages over previously proposed systems.

While the invention has been described, it will be understood that it is capable of further modifications and this application is intended to cover any variations, uses, or adaptations of the invention following in general, the principles of the invention and including such departures from the present disclosure as come within known or customary practice in the

What I claim is:

1. An electromagnetic beam communication unit, comprising:
   a. means for generating a directional electromagnetic beam,
   b. modulation cell means disposed in the path of said electromagnetic beam,
   c. the modulation cell means including two oppositely oriented cell units disposed side by side each having a transducer at the receiving end and an absorber at the other end,
   d. electromagnetic frequency modulation generating means connected to the receiving end of each of the fluid cell units for imparting a travelling periodic wave diffraction pattern which travels along the length of each cell unit, resulting in two oppositely travelling parallel diffraction wave patterns within the modulation cell means,
   e. the directional electromagnetic beam being passed through the modulation cell orthogonally to the two oppositely travelling diffraction wave patterns and passing out of the modulation cell with the zero order diffraction pattern containing frequency components reflecting the frequency modulation signal of the frequency modulation means,
   f. detector means for detecting the frequency modulation components of the directional electromagnetic beam after it leaves the modulation cell means.

2. The electromagnetic beam communication system as set forth in claim 1, wherein:
   a. said electromagnetic beam is a laser beam having a band width of from 1 to 2 giga-cycles.

3. The electromagnetic beam communication system as set forth in claim 1, wherein:
   a. said detector means is positioned directly in line with said directional electromagnetic beam to pick up only the zero diffraction order of said directional electromagnetic beam after it leaves said modulation cell means.

4. The electromagnetic beam communication system as set forth in claim 1, wherein:
   a. said modulation cell is an electro-optical crystal;
   b. said electromagnetic frequency modulation generating means is a traveling wave tube; and
   c. a wave guide is connected between said traveling wave tube and said electro-optic crystal.

5. The electromagnetic beam communication system as set forth in claim 1, wherein:
   a. blocking means is disposed adjacent said modulation cell means for allowing only the zero diffraction order to pass therethrough.

6. An electromagnetic beam communication unit, comprising:
   a. electro-optical crystal diffraction modulation cell means through which an electromagnetic wave can be propagated from one end to another;
   b. said electro-optical crystal diffraction modulation cell comprising two oppositely oriented electro-optical diffraction cell units disposed side by side each cell unit responsive to frequency modulation wave transmitting means connected to one end of each of said cell units to produce two parallel oppositely traveling periodic waves which traverse said cell units from end to end to create a traveling diffraction grating effect in said crystal diffraction modulation cell means;
   c. electromagnetic coherent beam radiation means which passes through said electro-optical crystal modulation cell orthogonally to interact with said traveling diffraction grating;
   d. detector means adjacent said crystal for picking up the zero order diffraction pattern of said coherent electromagnetic beam; and producing a signal responsive to said zero order diffraction pattern; and
   e. signal conversion means responsive to said signal from said detector means to produce the desired output information.

7. The electromagnetic beam communication unit as set forth in claim 6, wherein:
   a. said frequency modulation wave transmitting means includes a traveling wave tube; and
   b. a wave guide is connected between said traveling wave tube and said electro-optical crystal diffraction modulation cell.

8. The electromagnetic beam communication unit as set forth in claim 6, wherein:
   a. said frequency modulation wave transmitting means includes a ridged wave guide between said crystal and said electromagnetic coherent beam radiation means.

9. The electromagnetic beam communication unit as set forth in claim 6, wherein:
   a. said electro-optical crystal diffraction modulation cell comprises a crystal of potassium deuterium phosphate.

10. The electromagnetic beam communication unit as set forth in claim 6, wherein:
    a. said electro-optical crystal diffraction modulation cell comprises a crystal of ammonium deuterium phosphate.

11. The electromagnetic beam communication unit as set forth in claim 6, wherein:
    a. said electro-optical crystal diffraction modulation cell comprises a crystal of lithium miobate.

12. The electromagnetic beam communication unit as set forth in claim 6, wherein:
    a. said crystal is approximately one inch long and one-quarter inch square in cross section.

13. The electromagnetic beam communication unit as set forth in claim 6, wherein:
    a. said frequency modulation wave transmitting means is a klystron tube.

14. The electromagnetic beam communication unit as set forth in claim 6, wherein:
    a. said electro-optical diffraction modulation cell means includes two solid, elongated crystals disposed side by side and having a simultaneous identical signal applied to an opposite end of each, whereby two traveling periodic waves each moving in opposite directions are produced to give oppositely traveling diffraction gratings.

* * * * *